United States Patent
Hansmann et al.

(10) Patent No.: US 6,941,148 B2
(45) Date of Patent: Sep. 6, 2005

(54) DEVICE REGISTRY FOR AUTOMATIC CONNECTION AND DATA EXCHANGE BETWEEN PERVASIVE DEVICES AND BACKEND SYSTEMS

(75) Inventors: Uwe Hansmann, Altdorf (DE); Lothar Merk, Weil i.Sch. (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 09/798,431

(22) Filed: Mar. 2, 2001

(65) Prior Publication Data
US 2001/0049286 A1 Dec. 6, 2001

(30) Foreign Application Priority Data
Jun. 3, 2000 (EP) .......................................... 00111785

(51) Int. Cl.[7] .............................................. H04Q 7/20
(52) U.S. Cl. ...................... 455/466; 455/466; 455/418; 455/414; 455/403; 455/406; 342/457; 342/463; 342/464
(58) Field of Search ................................ 455/466, 418, 455/414, 403, 406, 456, 419, 435.1, 433, 414.1, 414.3; 342/457, 463, 464

(56) References Cited

U.S. PATENT DOCUMENTS

| | | | |
|---|---|---|---|
| 5,969,678 A | * | 10/1999 | Stewart ...................... 342/457 |
| 6,259,405 B1 | * | 7/2001 | Stewart et al. .............. 342/457 |
| 6,415,156 B1 | * | 7/2002 | Stadelmann ................. 455/466 |
| 6,587,684 B1 | * | 7/2003 | Hsu et al. .................... 455/419 |
| 6,615,041 B2 | * | 9/2003 | Adamany et al. ......... 455/432.1 |
| 2003/0027581 A1 | * | 2/2003 | Jokinen et al. ............. 455/456 |
| 2003/0105839 A1 | * | 6/2003 | Ben ........................... 709/220 |
| 2003/0195001 A1 | * | 10/2003 | Tari et al. ................ 455/435.2 |

* cited by examiner

Primary Examiner—Emmanuel L. Moise
Assistant Examiner—Julio Perez
(74) Attorney, Agent, or Firm—Jerry W. Herndon; Yee & Associates, P.C.

(57) ABSTRACT

The present invention relates to communication improvements between a mobile device (12) and backend system (20) applications. A special purpose server computer—a Device Registry Server (18)—is switched between a large variety of different mobile device types (12) and a plurality of backend systems (20) for improving the communication between a mobile device and a backend system. The server (18) stores information usable for facilitating communication setup, operation and maintenance of device applications. Preferably, a ready-to-use, already customized device-type specific application can be downloaded from said server (18) to a variety of different mobile devices which is then used for easily communicate with any desired backend system (20).

15 Claims, 2 Drawing Sheets

DEVICE REGISTRY FOR AUTOMATIC CONNECTION AND DATA EXCHANGE BETWEEN PERVASIVE DEVICES AND BACKEND SYSTEMS

BACKGROUND OF THE INVENTION

The present invention relates to electronic data transfer, and in particular to communication improvements between a mobile device and backend applications.

Personal mobile communication is an important aspect for many people in modern life. A large portion of it is covered by pure voice data for use with mobile phones. The other part relates to electronic data traffic for use with a broad variety of 'mobile devices' often referred to as pervasive devices and further abbreviated herein as PDs, e.g., handhelds, personal digital assistants (PDAs), palm top computer, or mobile phones having extended functions, like e.g. WAP facility.

With increasing acceptance of such 'quasi-omnipotential' devices it has become a must for more and more enterprises to offer any kind of information services to their clients which are intended to be performed via such a PD and the respective enterprise. Such solutions are typically implemented in prior art such that a communication takes place between a succinctly programmed application installed on the client's PD and the corresponding counterpart application of a 'backend' system of the enterprise. Said backend system is in turn often connected to or comprises an enterprise database or any business solution program dedicated to any desired particular business process like, for example, a flight reservation system.

For the sake of clarity of the present invention the term 'backend system' has a very general meaning. It is understood to comprise any kind of hardware/software combination operated in order to provide or contribute to realizing the business process intended by the mobile device user, and which is not directly concerned with the pure communication of data between the client and the enterprise.

Data are communicated from the PD to the enterprise along an 'online' connection via a particular Proxy Server. In order for the incoming data to be able to be processed by a servlet, i.e., a server-associated application, of the backend system it is processed by a so-called 'content adaptation engine' often located close to or integrated into the backend system. Other locations are of course possible and able to be integrated into the inventional concept disclosed later herein. Said engine is the actual communication partner for the PD and acts as a backend adapter. It usually has routing capabilities, supports a plurality of transfer protocols for in-and-out-traffic and transcodes the pure communication data into datasets which are adequately styled for being used in a database application, for example, which realizes the business process underlying the concerned PD-to-enterprise backend system communication.

Said prior art connections between the pervasive device and said backend system are very static and proprietary, and thus not flexible enough. The pervasive device has to connect to said Proxy server which must be previously configured at the device because the server is specific to the device. The Proxy server then connects to a statically configured server which in turn connects to the predefined backend system. Thus, each PD has to be assigned to a dedicated proxy server acting as a gateway for the application actually in use it.

As those Pervasive Devices become more and more important for the intended goal of 'information retrieval at any time at any place', it is necessary that these devices can connect to many different backend systems in a flexible way without knowing in advance which backend system will hold the user-required data whereby a minimum extent of customization work for the PD-user should be tolerated in view of an envisaged increased user comfort.

Further, it is neither possible to easily change between pervasive devices if they are not specifically set up for the connection to the backend system, nor is it possible to switch to a different backend system on the fly.

OBJECTS OF THE INVENTION

It is thus an object of the present invention to facilitate the communication of pervasive devices with backend servers in a more convenient manner.

SUMMARY OF THE INVENTION

This object of the invention is achieved by the features stated in enclosed independent claims. Further advantageous arrangements and embodiments of the invention are set forth in the respective subclaims.

In short, a special purpose server computer—a Device Registry Server—is switched between the large variety of different mobile device types and a plurality of backend systems for improving the communication between mobile device and backend system. The server stores information usable for facilitating communication setup, operation and maintenance of device applications. Preferably, a ready-to-use, already customized device-type specific application can be downloaded from said server to a variety of different mobile devices which is then used for easy communication with any desired backend system. Optionally, only the begin of the communication is done with the server, and once the communication has been established it can be continued directly between mobile device and backend system.

The present invention enables plug-and-play between different devices, different back-end systems and different applications.

The user of the device—when he wants to perform any desired business process—selects a business process, e.g., by selecting a respective icon or item visible on the display. The icon represents either a particular device application, e.g., a flight reservation front-end application, or it just represents a possibility, i.e., an option to perform a particular set of business processes, which are related to some general topic, as e.g., 'travelling'—associated with a symbolized aircraft icon. Behind said item/icon a program is implemented establishing a connection to a particular service provider or a group of providers. Upon receiving a double-click on said icon, i.e., start of said communication program an inventional Device Registry Server, further referred to and abbreviated herein as DRS is then connected via e.g., a mobile radio communication to the device.

According to a basic aspect of the present invention said DRS then uses an identification sent by said device to dynamically enable the device to connect to and retrieve data from a list of backend systems which are stored on the DRS. Said connection is enabled automatically by the DRS. Communication details can preferably be hidden from the user of the pervasive device in order to keep said person free from any auxiliary data traffic information not directly related to the intended business process.

The pervasive device can advantageously store a plurality of DRS addresses. Advantageously, a DRS is associated with a particular service provider, as e.g., a travel agency which offers a plurality of different services for each of which there is provided a dedicated backend system the provider is connected or connectable to. For example, a travel agency offers flight reservations of a plurality of airlines. It offers hotel reservations for a number of hotel chains, train reservation, ticket reservations for a number of selected events, etc. This further increases the flexibility during use and enables covering a plurality of potential business processes to be performed.

In particular, the DRS enters the device ID to a device registry associated with it. This is necessary for the server to be able to offer a variety of device applications for download to the device. Thus, according to this further aspect of the present invention it is not required for the device to store all the device applications which might be interesting for the user. Instead, the option is provided to download a specific device application and then use it in order to perform whatever business process with it in conjunction with the associated backend system—while at least the initial contact between the device and the backend system is managed via the DRS.

For said purposes each application has an ID. If the user already knows the ID of the application he wants to call he can pre-configure the server communication program activated by said double-click mentioned above on the device. Then the application ID as well as the information if the application had already been downloaded to the device will be delivered by virtue of the device identification mentioned above.

If—otherwise—the user does not know the application ID, the registry server will provide a list of available applications to the device. After the application is selected, the Registry Server Communication Program in the device will check if the required device application, or preferably— its latest version—is already downloaded. If not, it will be downloaded from the application repository associated with the Device Registration Server. By that, automatically the latest version of any application is run on the device.

Then the Registry Server establishes a connection to the backend system via its backend router. The router holds tables that define on which backend system the required application is installed. Thus, the following advantages can be achieved:

A flexible communication setup of mobile devices is provided to different back-end systems within a service provider.

A flexible switching of said devices to communicate with different back-end systems is provided.

By the above described the device application download on demand storage place is saved and the latest version can automatically be used without the need to support the older versions which are present in prior art systems in a plurality of devices dispersed all over the world.

A plug-and-play can be easily realized for mobile devices within different applications even when they are highly proprietary as is usually the case today.

BRIEF DESCRIPTION OF THE DRAWINGS

The present invention is illustrated by way of example and is not limited by the shape of the figures of the accompanying drawings in which.

DETAILED DESCRIPTION OF THE PREFERRED EMBODIMENT

Figure 1:
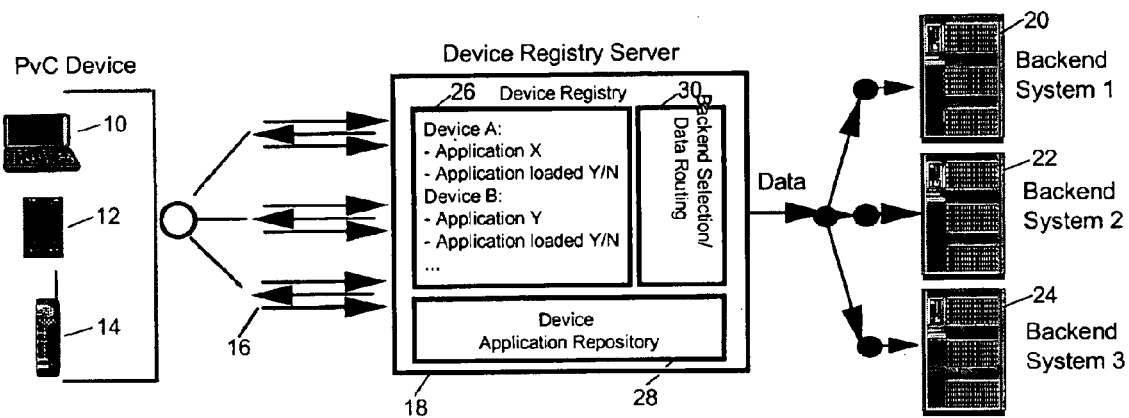
FIG. 1 is a schematic block diagram showing the basic elements in a preferred embodiment of the present invention.

With general reference to the figures and with special reference now to FIG. 1 three different mobile devices are depicted at the left margin of the drawing: a small handheld computer 10, a Palmtop computer 12 and a mobile phone 14. The mobile devices depicted there should be understood to be only exemplary for the sake of the present invention. Common to all mobile devices is a wireless communication facility with some communication partner, like an online-switched server which is accessible via for example a TCP/IP-connection or a telephone number. Said communication is symbolized with arrows 16.

A device registry server (DRS) 18 comprises a send/receive-unit not explicitly depicted in order to communicate with the mobile devices 10, 12, 14 and a number of backend systems 20, 22, 24 depicted at the right margin of the drawing. The DRS 18 further comprises a device registry 26 which comprises a data base in which a plurality of mobile devices 10, 12, 14 are stored preferably with their respective IDs and together with it—the information if a specific application depicted as X or Y is already loaded down to the respective mobile device or not. It should be understood that further information can be stored as well in order to provide an extended functionality to the DRS 18, for example the name and address data of the users of the stored devices.

A device application repository 28 stores all available applications for performing downloads to a particular device. It should be understood that said repository 28 is large enough to store a large number of applications because usually said applications are proprietary and thus particular for each device manufacturer enterprise.

Further, a backend selection/data routing unit 30 is provided within the DRS 18 in order to select the proper backend system according to the selection initiated by the user of the device 10, 12, 14 and in order to route the data to the selected backend system 20, 22, 24.

This basic configuration data can be exchanged between the mobile devices 10, 12, 14 and with the backend systems 20, 22 or 24. It should be understood that a much larger number of backend systems can be supported by the device registry server 18 than is depicted in the drawing.

Figure 2:
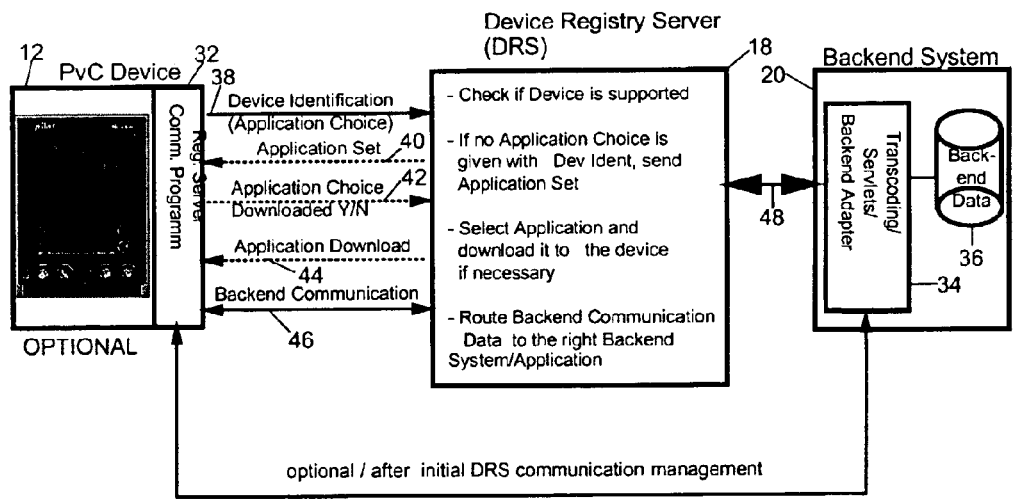
FIG. 2 is a schematic block diagram according to FIG. 1 showing some more details and some basic functionality in it.

With reference now to FIG. 2 some more details and some basic functionality are described next with reference to a sample connection between a handheld computer 12 and a specific backend system 20 via said device registry server 18 depicted in FIG. 1.

The handheld computer 12 comprises a registry server communication program 32. Said program is to be understood as a terminal program supporting for example the TCP/IP-communications and which can thus send and receive data for the intended data exchange with the backend system 20. The backend system 20 comprises a backend adapter unit 34 which transcodes the incoming data into a format which can be processed by a backend data base 36 in which the business data are stored and which are processed by a particular servlet corresponding to the application or applet, respectively, used in the mobile device 12.

The basic steps of the communication are as follows:

A communication between the mobile device 12 and the DRS 18 is built up initiated by the mobile device and comprising first a device identification to the DRS 18, arrow 38. By looking up the device registry it is checked if the particular device 12 is supported by the DRS. When no application ID is sent along with the device identification the DRS 18 sends back a set of applications available for a later download to the device, dotted arrow 40. Then the device user selects a specific application for a download and in response thereto the DRS 18 performs the download of the desired application back to the device, dotted arrows 42, 44.

In case the end-user has already specified or started a particular application the backend communication can be immediately performed without a separate application download because in this case the device application is already present on the device. Thus, the communication data can be associated to the right backend system 20 via a lookup of the backend selection unit which comprises a table in which any valuable application ID is cross-connected to a specific backend system and preferably cross-connected to a mobile device ID for support purposes. In this case the backend communication comprises two distinct paths, the first path 46 and the second path 48 as the DRS 18 is a kind of switching station between the mobile device 12 and the backend system 20.

Optionally, when a proper and error free communication between the mobile device 12 and the respective backend system 20 has once been confirmed for example due to an initial DRS communication management, as described in context with arrows 38, 40, 42 or 44, or confirmed by an update-flag issued from the backend system to the respective mobile device during an earlier communication, then the communication between the mobile device 12 and the backend system 20 can directly be performed without cooperation of the DRS 18, as it is depicted with arrow 15 in the drawing. Then, any relevant communication data as IP-addresses, etc. must be known at the backend system and at the mobile device. Corresponding storage facilities, however, might be easily provided in both the mobile device and in the backend system.

It should be noted, however, that said direct link 50 is an optional feature of the communication method according to the present invention.

Figure 3:
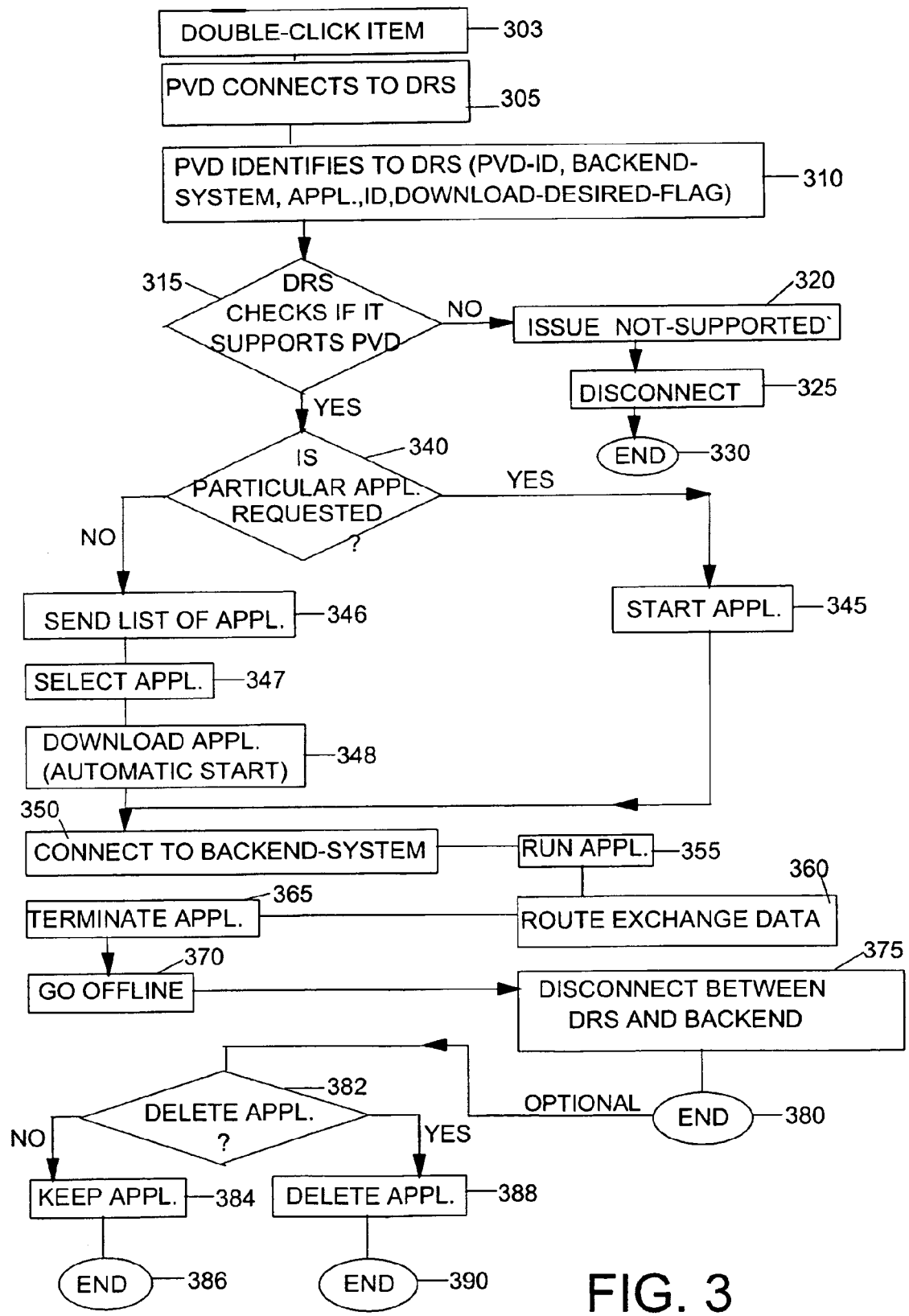
FIG. 3 is a schematic block diagram showing the basic elements of the control flow in a selected sample communication according to a preferred embodiment of the communication method according to the present invention.

With reference now to FIG. 3 the basic elements of the control flow in a selected sample communication according to a preferred embodiment of the inventional communication method is described in more detail next below.

In this example, a WAP Phone is used as a mobile device 14 in order to check if a flight which has already been booked by the WAP phone user is already confirmed by the respective service provider.

The WAP phone 14 is a 'pervasive device' in the sense of the present patent application and is thus abbreviated in the drawing as PVD.

Behind a specific WAP phone item the URL of a travel agency's device registry server is stored. On a double click of this item, step 303, the PVD connects to the DRS, step 305. In a first message the device ID and an application ID as well as a download-desired flag is transmitted to the DRS. Thus, in a step 310 the DRS can identify the calling device and can check if said device is supported, which leads to a decision 315.

If it is not supported the server issues back a "not-supported" message, step 320 and disconnects the communication line, step 325 whereby the desired business process must be finished unsuccessfully, step 330.

In the yes-branch of 315 it is checked if a particular application is requested by the device, which leads to a decision 340. Said decision is taken by evaluating the application ID comprised in the first transmission, step 305.

In the yes-branch of 340 the download-desired-flag can be evaluated by the server as 'not-desired' and thus a confirmation flag is sent back to the device which immediately triggers the start of the device application already present on the device, step 345. Advantageously said confirmation flag can be refused when a device application is stored on the device in a particular version which is not the latest one and is thus not anymore supported by the backend system. In this case a download of the latest version is triggered preferably accompanied by an automatic start-trigger when the download has completed.

In the no-branch of decision 340 no particular application has been requested by the device. Then a list of applications is sent in a step 346 from the DRS 18 to the device. The user then selects the particular application which he is interested in. Preferably, each application is symbolized by a significant easy-to-recognize-icon preferably accompanied by a short description of the functionality of the respective application in order to enable the user to select the right application which corresponds to the intended business process, step 347. Said selection is transferred to the DRS and in a step 348 the respective download can be performed by evaluating the application ID. Here, as well an automatic start is triggered preferably.

Then, for both branches of decision 340 the DRS 18 connects to the backend systems defined by the selected application. The communication paths are now opened and the application can be run both at the device side and the backend side, step 355, and data can be exchanged by inter-operation of the DRS which routes the exchange data from the mobile device to the backend system and in the reverse direction, as well. When a respective data exchange has been performed, for example a message was transmitted from the backend system to the WAP phone saying that a pre-specified flight is confirmed now by the airline the intended business process can be completed and thus the applications can be terminated, step 365. Thus, preferably the DRS cuts the online connection and the mobile device is switched off-line, again, step 370. This happens automatically in order to save online costs. Simultaneously, the DRS 18 disconnects between itself and the backend system actually used in the above communication, step 375. With this step the core of the communication is completed, 380.

Optionally, the device user is further asked if he wishes to delete the application again, which leads to a decision 382. In the no-branch the application is kept stored at the device side and the device can be switched off, for example, whereas in the yes-branch the application is deleted, step 388, whereby a certain amount of storage space can be provided in the device in order to use or store further, different applications or data. Thereafter the device can be switched off as well, step 390.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A communication tool according to the present invention can be realized in a distributed fashion where different elements are spread across several interconnected computer systems, as described above. The mobile device is the remote communication partner, whereas the DRS and the backend-system are more centrally located communication partners. Any kind of computer system or other apparatus adapted for carrying out the methods described herein is suited. A typical combination of hardware and software is thus a mobile device and a DRS server computer, e.g., a general purpose computer system whereby a computer program implementing the inventive method steps, when being loaded and executed, controls the computing devices/system such that they carry out the respective methods described and claimed herein.

The present invention can also be embedded in a computer program product, which comprises all the features enabling the implementation of the methods described herein, and which—when loaded in a computer system or in a device—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

What is claimed is:

1. A method for communication between a mobile device and a backend system, characterized by the steps of:

establishing a first communication connection between the mobile device and a Device Registry Server (DRS);

receiving a selection from the mobile device of a backend application of the backend system with which the mobile device is to communicate;

determining if a download of a device application from the Device Registry Server to the mobile device is needed for communication between the mobile device and the backend application;

downloading the device application from the Device Registry Server to the mobile device if a download of the device application is needed; and establishing a second communication connection between the Device Registry Server and the backend system in order to be able to exchange data between the device application on the mobile device and the backend application of the backend system.

2. The method according to claim 1, further comprising the step of offering an option to a user of the mobile device to delete at least one application component from the mobile device after use.

3. The method according to claim 1, further comprising the steps of:

determining if the device application on the mobile device is a latest version, and if the device application is not the latest version, downloading the latest version to the mobile device.

4. The method according to claim 1, wherein the mobile device stores a plurality of Device Registry Server addresses, and wherein the Device Registry Server is located based on one of the plurality of Device Registry Server addresses.

5. A communication method between a mobile device and a backend system comprising the steps of:

receiving a request for a communication between a mobile device and a backend system, selecting a particular backend system application matching the request, the system application having application components, routing the communication request to the particular backend system, keeping application components ready for a selection by and/or a download to a mobile device, responsive to receiving a request from the mobile device for selection of at least one application component, determining if a download of the application component is needed based on the communication request, if download of the application component is needed, downloading the application component to the mobile device.

establishing a connection to the particular backend system application responsive to a request from the mobile device for application data, and exchanging application data between the application component on the mobile device and the particular backend application of the backend system.

6. The method according to claim 5, wherein selecting a particular backend system application matching the request includes selecting the matching backend system application from a table storing at least a plurality of mobile device Ids and respective backend system application Ids.

7. A server computer having means for performing the method of claim 5.

8. The server computer according to the claim 7, comprising an application repository comprising available application components, a filter mechanism for selecting components for a specific mobile device, and a routing component for establishing a connection between a selected backend system application and the specific mobile device.

9. A computer program comprising code portions adapted for performing the steps according to the method according to claim 1, when said program is executed in a computing device.

10. A computer program product stored on a computer usable medium comprising computer readable program means for causing a computer to perform the method of claim 1, if said program product is executed on said computer.

11. The method according to claim 1, further comprising the step of:

exchanging subsequent data directly between the device application on the mobile device and the backend application of the backend system.

12. The method according to claim 1, wherein the first communication connection includes a device identification, an application identification, and a download-desired flag, wherein the device identification identifies the mobile device, and wherein the application identification identifies a device application selected by a user of the mobile device, and wherein the download-desired flag indicates whether the user of the mobile device desires the download of the device application selected.

13. The method according to claim 12, wherein determining if a download of a device application from the Device Registry Server to the mobile device is needed for communication between the mobile device and the backend application further comprising the steps of:

checking the device identification against a device registry of the Device Registry Server to determine if the mobile device is supported;

if the mobile device is supported, evaluating the application identification against the device registry to determine if a device application is selected by the user of the mobile device; and if the device application is selected by the user of the mobile device, evaluating the download-desired flag to determine if a download of the device application selected is desired by the user of the mobile device.

14. The method according to claim 13, further comprising the step of:

if the device application is not selected by the user of the mobile device, sending a list of device applications available for download to the mobile device, wherein the device applications available for download is stored in a device application repository of the Device Registry Server.

15. The method according to claim 1, wherein establishing a second communication connection between the Device Registry Server and the backend system further comprising the steps of:

identifying a backend system from a plurality of backend systems using a backend selection unit of the Device Registry Server, wherein the backend selection unit performs a lookup of backend systems in a table, wherein the table includes a plurality of device identifications and corresponding backend system application identifications.

* * * * *

UNITED STATES PATENT AND TRADEMARK OFFICE
CERTIFICATE OF CORRECTION

PATENT NO. : 6,941,148 B2
DATED : September 6, 2005
INVENTOR(S) : Hansmann et al.

It is certified that error appears in the above-identified patent and that said Letters Patent is hereby corrected as shown below:

Title page, Item [54] and Column 1, lines 1-4,
Title, delete "DEVICE REGISTRY FOR AUTOMATIC CONNECTION AND DATA EXCHANGE BETWEEN PERVASIVE DEVICES AND BACKEND SYSTEMS"
insert -- DEVICE REGISTRY SERVER FOR AUTOMATIC CONNECTION AND DATA EXCHANGE BETWEEN PERVASIVE DEVICES AND BACKEND SYSTEMS --.

Column 8,
Line 39, after "readable" delete "program".

Signed and Sealed this

Twenty-seventh Day of December, 2005

JON W. DUDAS
*Director of the United States Patent and Trademark Office*